United States Patent
Leon Guerrero et al.

(10) Patent No.: US 11,592,126 B1
(45) Date of Patent: Feb. 28, 2023

(54) ELASTOMERIC AIR INDUCTION HIGH-PRESSURE HOSE WITH SLEEVE

(71) Applicant: FORD GLOBAL TECHNOLOGIES, LLC, Dearborn, MI (US)

(72) Inventors: Miguel Angel Leon Guerrero, Ecatepec de Morelos (MX); Luis Felipe Blas Martinez, Jilotepec (MX); Victor H Hugo Torrejon Allende, Metepec (MX); Virginia Ortega Conde, Alvaro Obregon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/665,177

(22) Filed: Feb. 4, 2022

(51) Int. Cl.
| | |
|---|---|
| *F16L 11/12* | (2006.01) |
| *F02M 35/10* | (2006.01) |
| *F02M 31/20* | (2006.01) |
| *F16L 59/02* | (2006.01) |
| *F16L 7/00* | (2006.01) |
| *F02B 37/00* | (2006.01) |

(52) U.S. Cl.
CPC ............ *F16L 11/125* (2013.01); *F02B 37/00* (2013.01); *F02M 31/20* (2013.01); *F02M 35/10268* (2013.01); *F16L 7/00* (2013.01); *F16L 59/021* (2013.01); *F02M 35/10118* (2013.01); *F02M 35/10124* (2013.01); *F02M 35/10137* (2013.01)

(58) Field of Classification Search
CPC ......... F16L 59/021; F16L 57/00; F16L 57/06; F02M 35/10118; F02M 35/10124; F02M 35/10137; F02M 35/10091–10144; F02B 37/00

USPC ................................ 138/110, 153, 172, 173
See application file for complete search history.

(56) References Cited

U.S. PATENT DOCUMENTS

| | | | | |
|---|---|---|---|---|
| 1,330,316 | A * | 2/1920 | Hall ...................... | F16L 15/005 |
| | | | | 285/55 |
| 4,212,328 | A * | 7/1980 | Yamamoto ............ | F16L 11/133 |
| | | | | 138/133 |
| 6,354,937 | B1 | 3/2002 | Crook | |
| 9,038,671 | B2 | 5/2015 | Schelhaas et al. | |
| 9,494,113 | B2 | 11/2016 | Stec et al. | |

FOREIGN PATENT DOCUMENTS

| | | | | |
|---|---|---|---|---|
| DE | 4343467 A1 * | 6/1995 | ....... | F02M 35/10124 |
| EP | 0416655 A1 * | 3/1991 | | |

* cited by examiner

*Primary Examiner* — Laert Dounis
(74) *Attorney, Agent, or Firm* — Vincent Mastrogiacomo; Brooks Kushman P.C.

(57) ABSTRACT

An air-induction system of an engine includes a hose assembly. The hose assembly includes an elastomeric hose having a circular cross section when in a natural state, and a deformable sleeve received around the hose and configured to create an indentation in the hose for part clearance. The sleeve has an end section having a circular cross section and an intermediate section in which the sleeve projects radially inward into a sidewall of the hose such that the hose is deformed from the natural state to a deformed state in which the sidewall is deformed radially inward creating the indention and a non-circular cross section of the hose at the intermediate section.

20 Claims, 6 Drawing Sheets

ELASTOMERIC AIR INDUCTION HIGH-PRESSURE HOSE WITH SLEEVE

TECHNICAL FIELD

This disclosure relates to forced-induction engines and more particularly to high-pressure elastomeric hosing of the engine air-induction system.

BACKGROUND

Turbocharged and supercharged engines may be configured to compress ambient air entering the engine in order to increase power. Because compression of the air may cause an increase in temperature of the air, a charge-air cooler (sometimes called an intercooler) may be utilized to cool the heated air thereby increasing its density and further increasing the potential power of the engine. Air ducts are used to carry air between the air box, the compressor, the charge-air cooler, and the engine.

SUMMARY

According to one embodiment, an air-induction system of an engine includes a hose assembly. The hose assembly includes an elastomeric hose having a circular cross section when in a natural state, and a deformable sleeve received around the hose and configured to create an indentation in the hose for part clearance. The sleeve has an end section having a circular cross section and an intermediate section in which the sleeve projects radially inward into a sidewall of the hose such that the hose is deformed from the natural state to a deformed state in which the sidewall is deformed radially inward creating the indention and a non-circular cross section of the hose at the intermediate section.

According to another embodiment, an engine system includes a turbocharger, a fluid line, and a hose assembly in fluid communication with the turbocharger. The hose assembly includes an elastomeric hose having a circular cross section when in a natural state and a sleeve received around the hose. The sleeve includes an indentation that projects into a sidewall of the hose to deform the hose from the natural state to a deformed state in which the sidewall is deformed radially inward. The fluid line extends over the indentation such that the indentation increases a part clearance between the fluid line and the sidewall of the hose.

According to yet another embodiment, a method of manufacturing a hose assembly includes forming an elastomeric hose having a circular cross section within an inner diameter and an outer diameter; providing a circular sleeve having an inner diameter that substantially matches the outer diameter of the hose; installing the sleeve on the hose such the sleeve extends along a portion of the hose and the inner diameter of the sleeve is disposed on the outer diameter of the hose; and plastically deforming an intermediate section of the sleeve in a tool to create an indentation that projects radially inward into a sidewall of the hose such that the hose is deformed from a natural state to a deformed state in which the sidewall is deformed radially inward.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Figure 1:
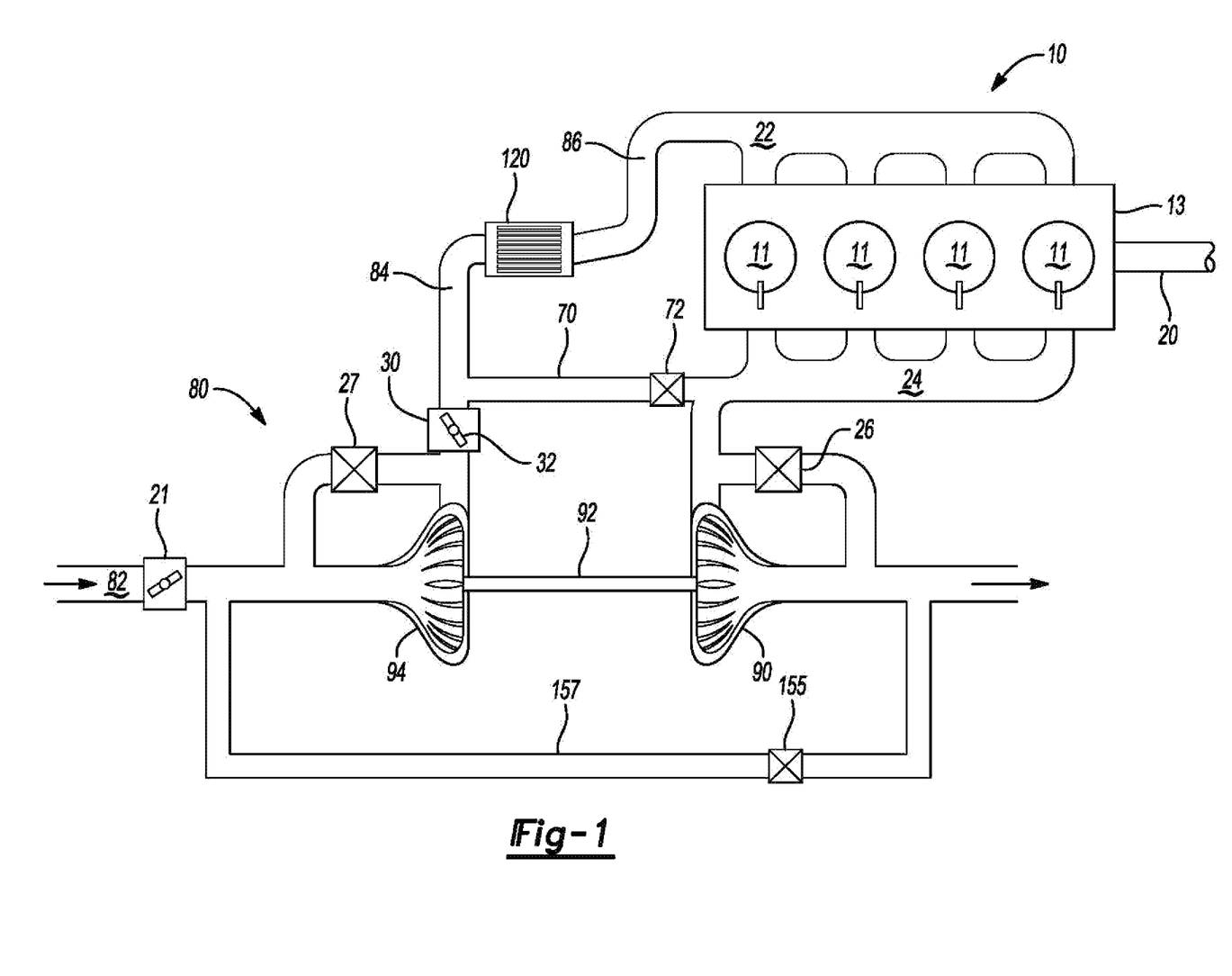
FIG. 1 is a diagrammatical view of an engine system.

Referring to FIG. 1, an engine system 10 may be a diesel engine, a gasoline engine, or other type of engine that utilizes various components in accordance with the present disclosure. The system 10 includes an internal-combustion engine 13 having a block defining a plurality of cylinders 11. The engine 10 is controlled by an engine controller sometimes referred to as an ECU or PCM. The engine 10 includes pistons (not shown) positioned within the cylinders 11 and connected to a crankshaft 20. The cylinders 11 communicate with an intake manifold 22 and an exhaust manifold 24 via respective intake and exhaust valves. The intake manifold 22 may be integrated within a cylinder head (not shown) or may be a stand-alone component. Additionally or alternatively, the exhaust manifold 24 may be integrated within the cylinder head or may be a stand-alone component.

The intake manifold 22 communicates with a throttle body 30 via a throttle plate 32. While the throttle body 30 is depicted as being downstream of a compressor 94, it will be appreciated that the throttle body 30 may be placed upstream of the compressor 94 in other designs. Alternatively, or additionally, the throttle body 30 may be placed in the air-induction system downstream of the charge-air cooler.

The engine system 10 may include an exhaust gas recirculation (EGR) system to help lower NOx and other emissions. For example, the engine 10 may include a high-pressure EGR system in which exhaust gas is delivered to the intake manifold 22 by a high-pressure EGR passage 70 communicating with the exhaust manifold 24 at a location upstream of a turbine 90 of a compression device, e.g., a turbocharger, and communicating with the intake manifold 22 at a location downstream of the compressor 94. A high-pressure EGR valve assembly 72 may be located in a high-pressure EGR passage 70. Exhaust gas may then travel from the exhaust manifold 24 first through the high-pressure EGR passage 70, and then to the intake manifold 22. The amount of EGR provided to the intake passage, upstream of throttle body 30 and downstream of a charge-air cooler 120, may be varied by the controller via an EGR valve, such as the high-pressure EGR valve 72. An EGR cooler (not shown) may be included in high-pressure EGR hose 70 to cool re-circulated exhaust gases before entering the intake manifold. Cooling may be done using engine coolant or by an air-to-exhaust gas heat exchanger.

FIG. 1 also shows a low-pressure EGR system where EGR is routed from downstream of the turbine 90 to upstream of the compressor 94 through a low-pressure EGR passage 157. A low-pressure EGR valve 155 may control the amount of EGR provided to the passage 157. In some embodiments, the engine may include both a high-pressure EGR and a low-pressure EGR system, as shown in FIG. 1. In other embodiments, the engine may include either a low-pressure EGR system, a high-pressure EGR system, or none. When operable, the EGR system may increase the formation of condensate as it increases the water vapor concentration in the charge air, particularly when the charge air is cooled by a charge-air cooler. The shown EGR is but one example and other arrangements are contemplated including the omission of any EGR.

A compression device may be a turbocharger (as shown), a supercharger, or the like. The depicted compression device may have a turbine 90 coupled with the exhaust manifold 24 and a compressor 94 coupled with the intake manifold 22 via a charger-air cooler (intercooler) 120, which may be an air-to-air heat exchanger, but could also be liquid cooled. The turbine 90 is typically coupled to the compressor 94 via a drive shaft 92. The speed of the turbine 90 may be controlled by a wastegate 26. A sequential turbocharger arrangement, single VGT, twin VGTs, or any other arrangement of turbochargers could be used and could include coolers within the compression device system, such as between two stages of compression.

The engine system 10 includes an air-induction system 80 configured to convey air from outside of the vehicle to the intake manifold 22. An intake passage 82 may convey air from an airbox (not shown) to the compressor 94. The intake passage 82 may include an air-intake control valve 21. Additionally, the intake passage 82 may include a compressor bypass or recirculation valve (CRV) 27 configured to divert intake air around the compressor 94. The wastegate 26 and/or the CRV 27 may be controlled by the controller to be opened when a lower boost pressure is desired. For example, in response to compressor surge or a potential compressor-surge event, the controller may open the CRV 27 to decrease pressure at the outlet of the compressor 94. Additionally or alternatively, the CRV 27 and/or the wastegate 26 may be opened to decrease a pressure in the charge-air cooler 120 and as a result, reduce condensate formation in the charge-air cooler.

The compressor 94 may be upstream of the charge-air cooler 120 to provide compressed charge air to the charge-air cooler 120. The charge-air cooler 120 may be used to decrease the temperature of the turbocharged or supercharged compressed gas mixture. The charge-air cooler 120 may be an air-to-air cooler or a liquid-to-air cooler. Another passage 84 carries compressed air from the compressor 94 to the charge-air cooler 120. Air passage 86 connects between an outlet of the charge-air cooler and the intake manifold.

One or more of the air passages of the air-induction system 80 may be formed by an elastomeric hose. For example, elastomeric hose may connect between the compressor 94 and the charge-air cooler 120, between the throttle body 30 and the charge-air cooler 120 and/or between the charge-air cooler 120 and the intake manifold 22. Elastomeric hose, unlike other types, such as rigid plastic ducts, is flexible allowing for easier installation and packaging simplicity and has advantageous NVH. One drawback is that, due to its inherent properties, elastomeric hosing has a circular cross section. (The elasticity of the sidewalls causes the hose to expand to a circle regardless of resting shape once under pressure. For example, an elastomeric hose with an ovular cross section in the natural state will become circular under pressure thus defeating the purpose.) This can create part clearance difficulties. That is, unlike plastic ducts, which can be molded into unique shapes to create part clearance, elastomeric hose must achieve desired clearance through other means. One option is downsizing, but this may negatively affect flow rates. Additionally, elastomeric materials may be heat sensitive. To solve these and other problems, a hose assembly is proposed that includes a sleeve allowing for the plastic deformation of the elastomeric hose at select locations to increase part clearance and/or provide heat shielding.

Figure 2:
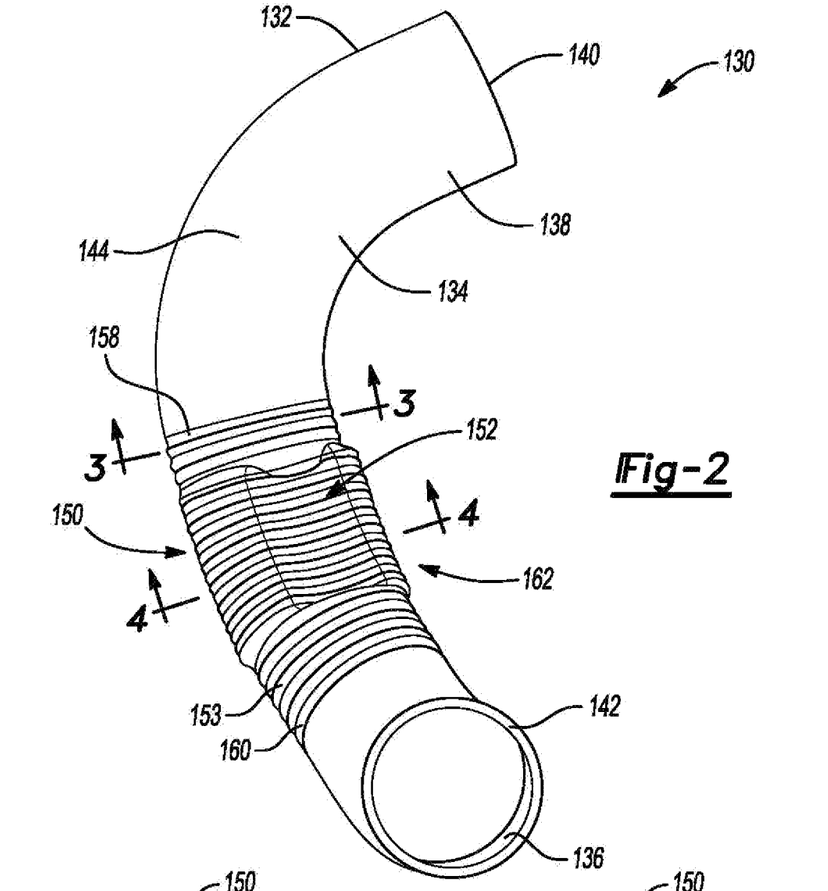
FIG. 2 is a perspective view of a high-pressure hose assembly of the engine system.
Figure 3:
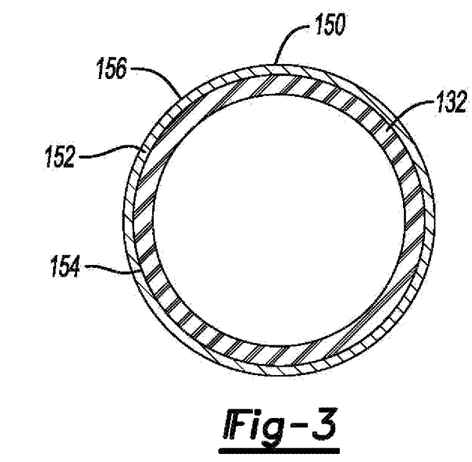
FIG. 3 is a section view of the hose assembly at cutline 3-3.
Figure 4:
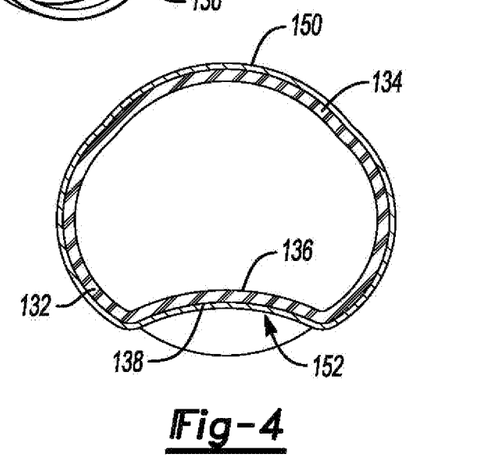
FIG. 4 is a section view of the hose assembly at cutline 4-4.

Referring to FIGS. 2, 3, and 4, a high-pressure air hose assembly 130 of an air-induction system is configured to convey pressurized air, for example, between the compressor and the charge-air cooler and/or between the charge-air cooler and the engine. The hose assembly 130 includes an elastomeric hose 132 having a circular cross section when in a natural state (resting state). The hose 132 has a circular sidewall 134 having an inner circumferential surface 136 (inner diameter) and an outer circumferential surface 138 (outer diameter). The inner surface 136 defines a hollow center configured to convey the pressurized air. The hose 132 has first and second ends 140, 142 and an intermediate portion 144.

A deformable sleeve 150 is received around a longitudinal section of the hose 132 and is configured to create an indentation in the hose for part clearance or other purpose. The sleeve 150 is concentrically arranged around the hose 132. The sleeve 150 may be formed of any ductile material capable of being plastically deformed without cracking, splitting, or otherwise breaking. For example, the sleeve 150 may be metal, such as aluminum or the like. The sleeve 150 generally includes a circular sidewall 153 having an inner circumferential surface 154 (inner diameter) and an outer circumferential surface 156 (outer diameter). The inner diameter 154 substantially matches the outer diameter 138 of the hose 132 albeit with clearance and tolerances for manufacture. The sleeve 150 includes end sections 158, 160 having a circular cross section and an intermediate section 162 in which the sleeve projects radially inward into the sidewall 134 of the hose 132 to form the indentation 152 and an irregular-shaped cross section.

The elastomeric hose 132, due to its resilient properties, is elastically deformable, but does not hold a deformed shape well, if at all, once the external force is removed, i.e., it bounces back to the natural, circular cross-sectional shape. In contrast, the sleeve 150 is plastically deformable. As such, the sleeve 150 can be plastically deformed, e.g., crushed, to modify the shape of the hose assembly 130 such as the shown indentation 152.

As best seen in FIG. 4, the sleeve 150 is plastically deformed radially inward thus pushing on the sidewall 134 of the hose 132. This puts the hose 132 in a deformed state to match the shape of the deformed sleeve. In the illustrated embodiment, the sleeve 150 has been crushed to form the indentation 152 and to ovalize the cross section. At the indention 152, the outer circumferential surface 138 of the sidewall of the hose is concave and the inner circumferential surface 136 of the sidewall is convex. However, the sleeve 150 may be deformed as needed to create part clearance. The sleeve 150 is strong enough to hold the deformed shape against the outward pressure of the compressed air during operation.

Figure 5:
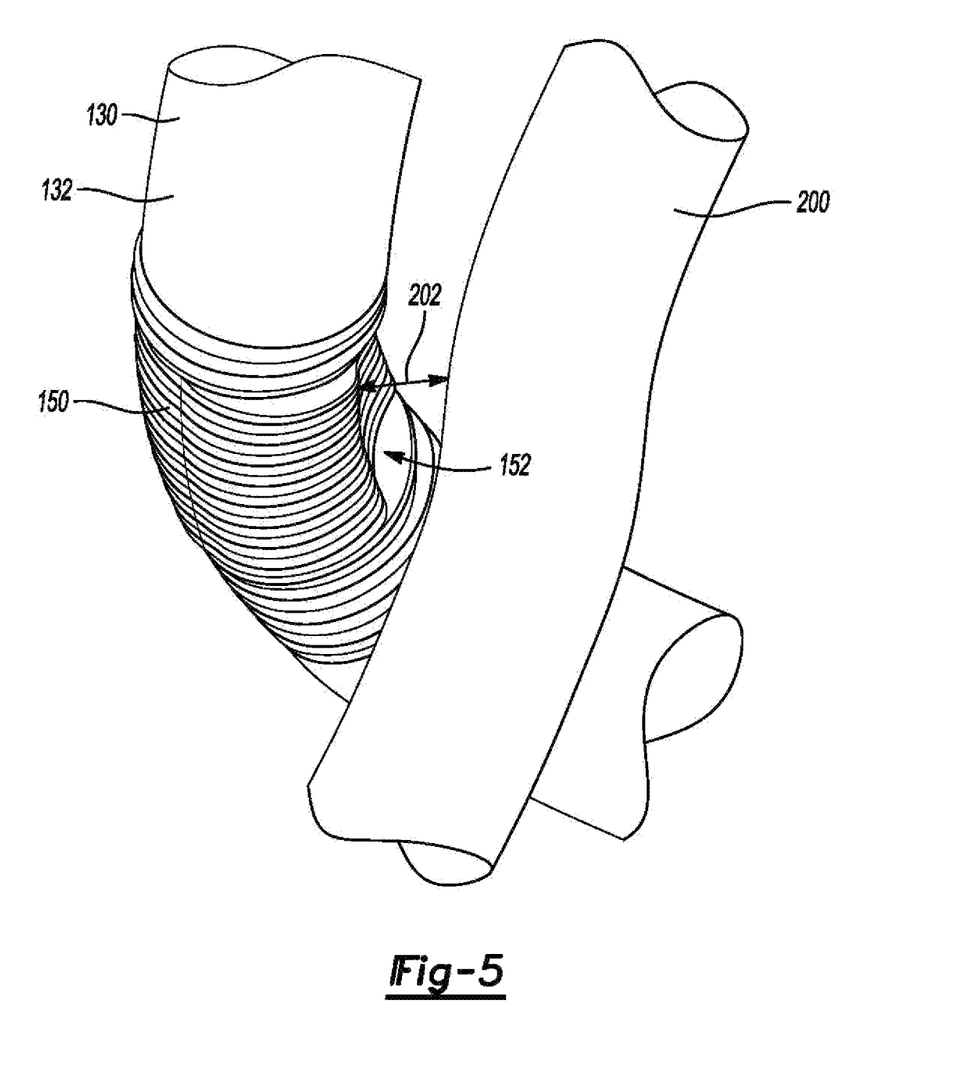
FIG. 5 is a perspective view illustrating additional part clearance created by features of the high-pressure hose assembly.

FIG. 5 shows the sleeve 150 and the indentation 152 being used to create sufficient part clearance with a fluid line 200. The fluid line 200 may be a coolant line, a transmission fluid line, an oil line, or the like. The fluid line 200 may be hot enough to affect elastomeric material. The part clearance 202 gained by the indentation 152 ensures integrity of the hose 132 by adding space compared to the resting diameter of the hose if the deformed sleeve was not present. In addition to the added clearance, the sleeve 150 may also provide heat shield for the hose 132.

Figure 6:
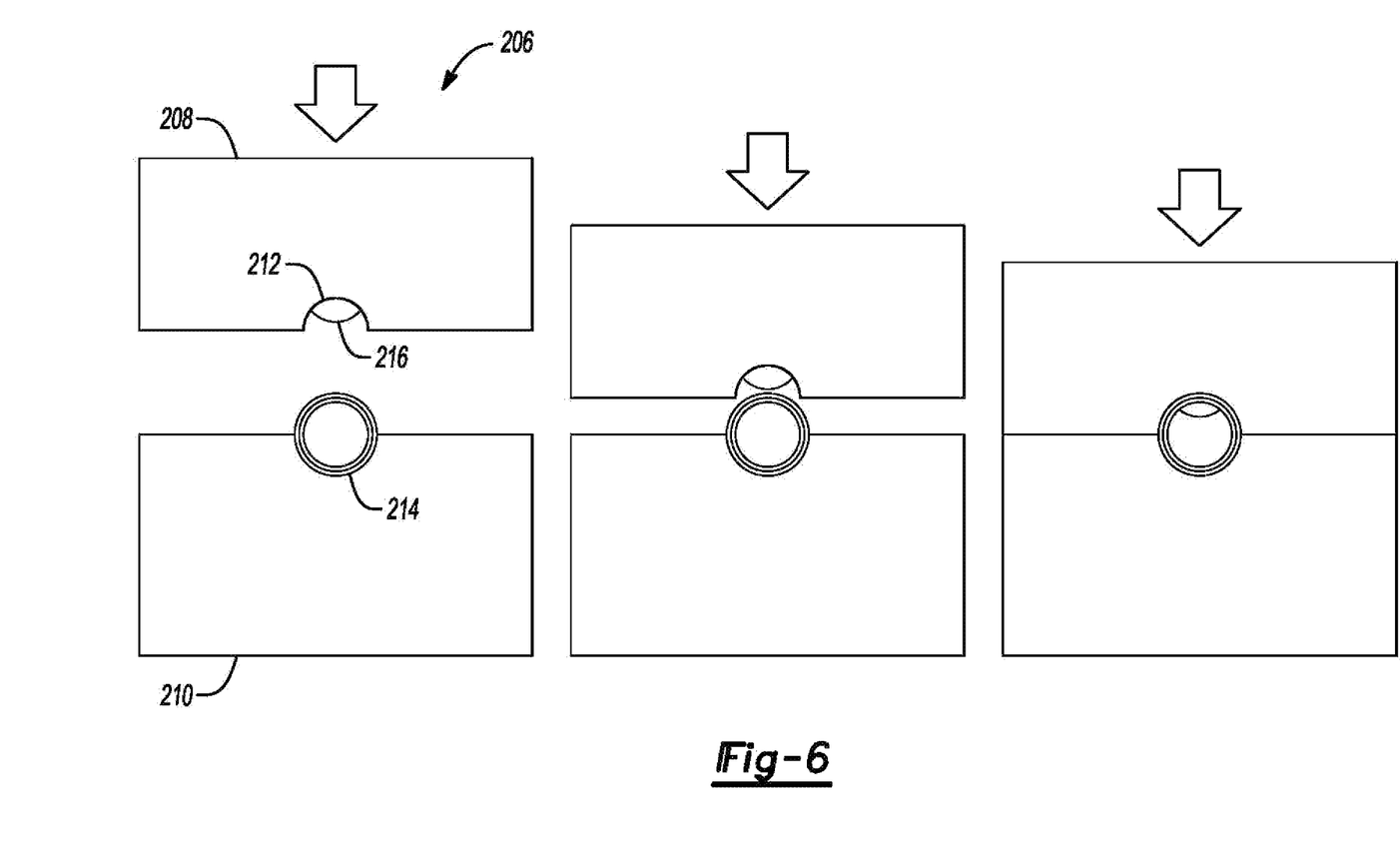
FIG. 6 is an example diagrammatical view of a tool used to form the high-pressure hose assembly.
Figure 7A:
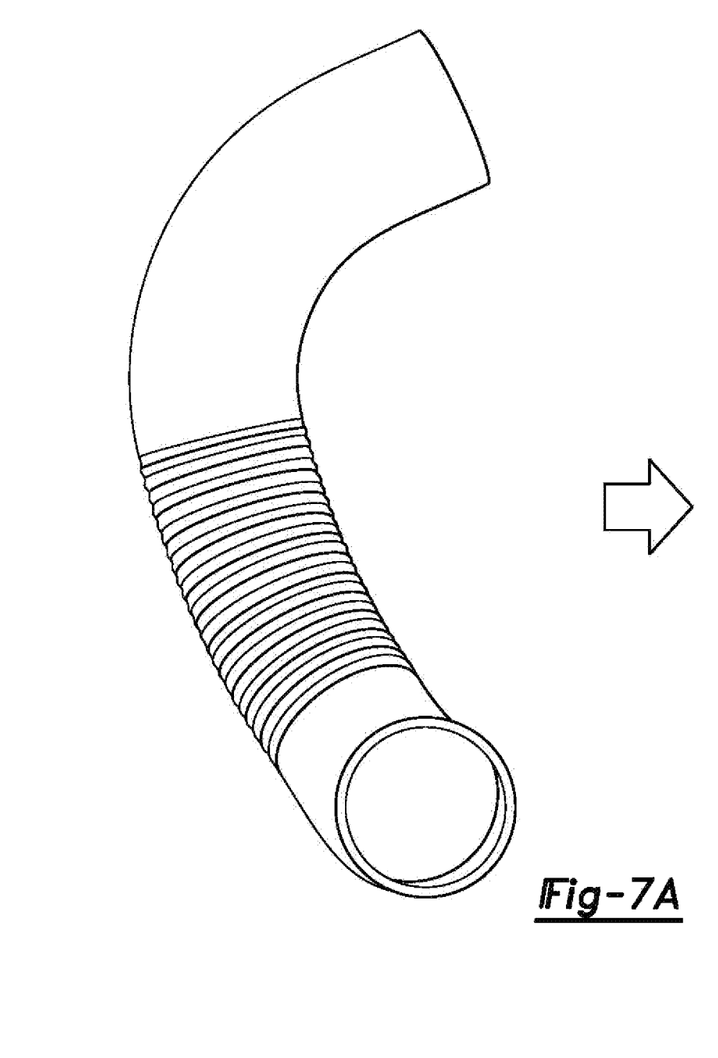
FIG. 7A is a perspective view of a high-pressure hose assembly prior to the deformation process.
Figure 7B:
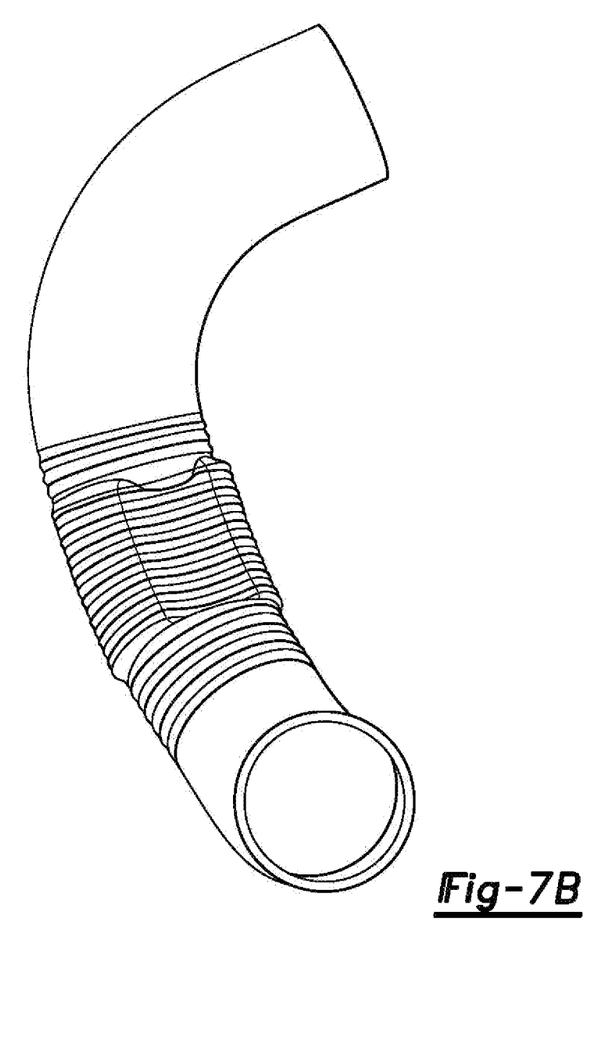
FIG. 7B is a perspective view of a high-pressure hose assembly after the deformation process.
Figure 8:
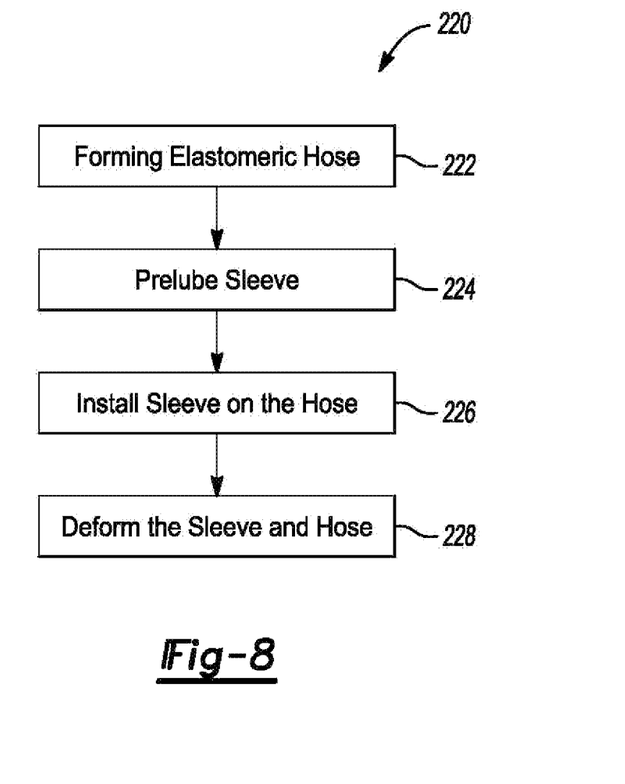
FIG. 8 is a flow chart of a method of manufacturing a high-pressure hose assembly.

Referring to FIGS. 6, 7, and 8 a method 220 of manufacturing a hose assembly includes forming an elastomeric hose having a circular cross section with an inner diameter and an outer diameter at step 222. At step 224, a circular sleeve is provided having an inner diameter that substantially matches the outer diameter of the hose. The sleeve is then installed on the hose at step 226. For example, as shown in FIG. 7A, the sleeve is installed on the hose such the sleeve extends along a portion of the hose and the inner diameter of the sleeve is disposed on the outer diameter of the hose.

After step 226, the hose assembly may be fully assembled and now can be cold worked to have the desired deformation at the sleeve. At step 228, the sleeve assembly may be placed in a tool 206 having upper and low dies 208, 210. The upper and lower dies may have channeling 212, 214 that matches the outer diameter of hose assembly such that the hose assembly does not deform when the dies close. Portions of the upper and lower channels 212, 214, or both include feature(s) 216 configured to engage, e.g., crush, the sleeve when the dies close. The feature(s) 216 is/are sized and shaped to deform the sleeve and the hose as desired to create indentations and the like. The dies may plastically deform an intermediate section of the sleeve to create an indentation, as discussed above, that projects radially inward into a sidewall of the hose such that the hose is deformed from the natural state to a deformed state in which the sidewall is deformed radially inward to increase part clearance.

The methods discussed herein may be represented by flow charts or similar diagrams in one or more figures. These figures provide representative methods or processes that may be implemented to manufacture the above-described apparatuses. The various steps illustrated may be performed in the sequence illustrated, in parallel, in a different sequence, or in some cases omitted. Although not always explicitly illustrated, one of ordinary skill in the art will recognize that one or more of the illustrated steps may be repeatedly performed depending upon the particular process.

While the hose assembly is described as being part of a turbocharger system, the above design and methods may be used on conduits of other vehicle systems.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An air-induction system of an engine comprising:
a hose assembly including:
an elastomeric hose having a circular cross section when in a natural state, and
a deformable sleeve received around the hose and configured to create an indentation in the hose for part clearance, the sleeve including an end section having a circular cross section and an intermediate section in which the sleeve projects radially inward into a sidewall of the hose such that the hose is deformed from the natural state to a deformed state in which the sidewall is deformed radially inward creating the indention and a non-circular cross section of the hose at the intermediate section.

2. The air-induction system of claim 1 further comprising a charge-air cooler, wherein an end of the hose is connected to the charge-air cooler.

3. The air-induction system of claim 1 further comprising a turbocharger, wherein an end of the hose is connected to the turbocharger.

4. The air-induction system of claim 1, wherein the sleeve is a heat shield.

5. The air-induction system of claim 1, wherein the sleeve is metal.

6. The air-induction system of claim 1, wherein, at the indentation, an outer circumferential surface of the sidewall of the hose is concave and an inner circumferential surface of the sidewall is convex.

7. The air-induction system of claim 1, wherein the hose is in the natural state at the end section of the sleeve.

8. The air-induction system of claim 1, wherein the sleeve has a second end section having a circular cross section, wherein the hose is in the natural state at the end sections of the sleeve.

9. An engine system comprising:
a turbocharger;
a fluid line; and
a hose assembly in fluid communication with the turbocharger, the hose assembly including an elastomeric hose having a circular cross section when in a natural state, and a sleeve received around the hose, wherein the sleeve includes an indentation that projects into a sidewall of the hose to deform the hose from the natural state to a deformed state in which the sidewall is deformed radially inward, wherein the fluid line extends over the indentation such that the indentation increases a part clearance between the fluid line and the sidewall of the hose.

10. The engine system of claim 9 further comprising a charge-air cooler, wherein the hose assembly connects the turbocharger and the charge-air cooler in fluid communication.

11. The engine system of claim 9, wherein, at the indentation, an outer circumferential surface of the sidewall of the hose is concave and an inner circumferential surface of the sidewall is convex.

12. The engine system of claim 9, wherein the fluid line is a coolant line.

13. The engine system of claim 9, wherein the sleeve is metal.

14. The engine system of claim 9, wherein the sleeve includes an end section having a circular cross section.

15. The engine system of claim 14, wherein the hose is in the natural state at the end section.

16. The engine system of claim 9, wherein the sleeve has end sections having circular cross sections, wherein the hose is in the natural state at the end sections.

17. The engine system of claim 9, wherein the indentation of the sleeve forms a matching depression in the sidewall.

18. A method of manufacturing a hose assembly, comprising:
forming an elastomeric hose having a circular cross section within an inner diameter and an outer diameter;
providing a circular sleeve having an inner diameter that substantially matches the outer diameter of the hose;
installing the sleeve on the hose such the sleeve extends along a portion of the hose and the inner diameter of the sleeve is disposed on the outer diameter of the hose; and
plastically deforming an intermediate section of the sleeve in a tool to create an indentation that projects radially inward into a sidewall of the hose such that the hose is deformed from a natural state to a deformed state in which the sidewall is deformed radially inward.

19. The method of claim 18, wherein the sleeve is metal.

20. The method of claim 18, wherein, at the indentation, an outer circumferential surface of the sidewall of the hose is concave and an inner circumferential surface of the sidewall is convex.

* * * * *